UNITED STATES PATENT OFFICE.

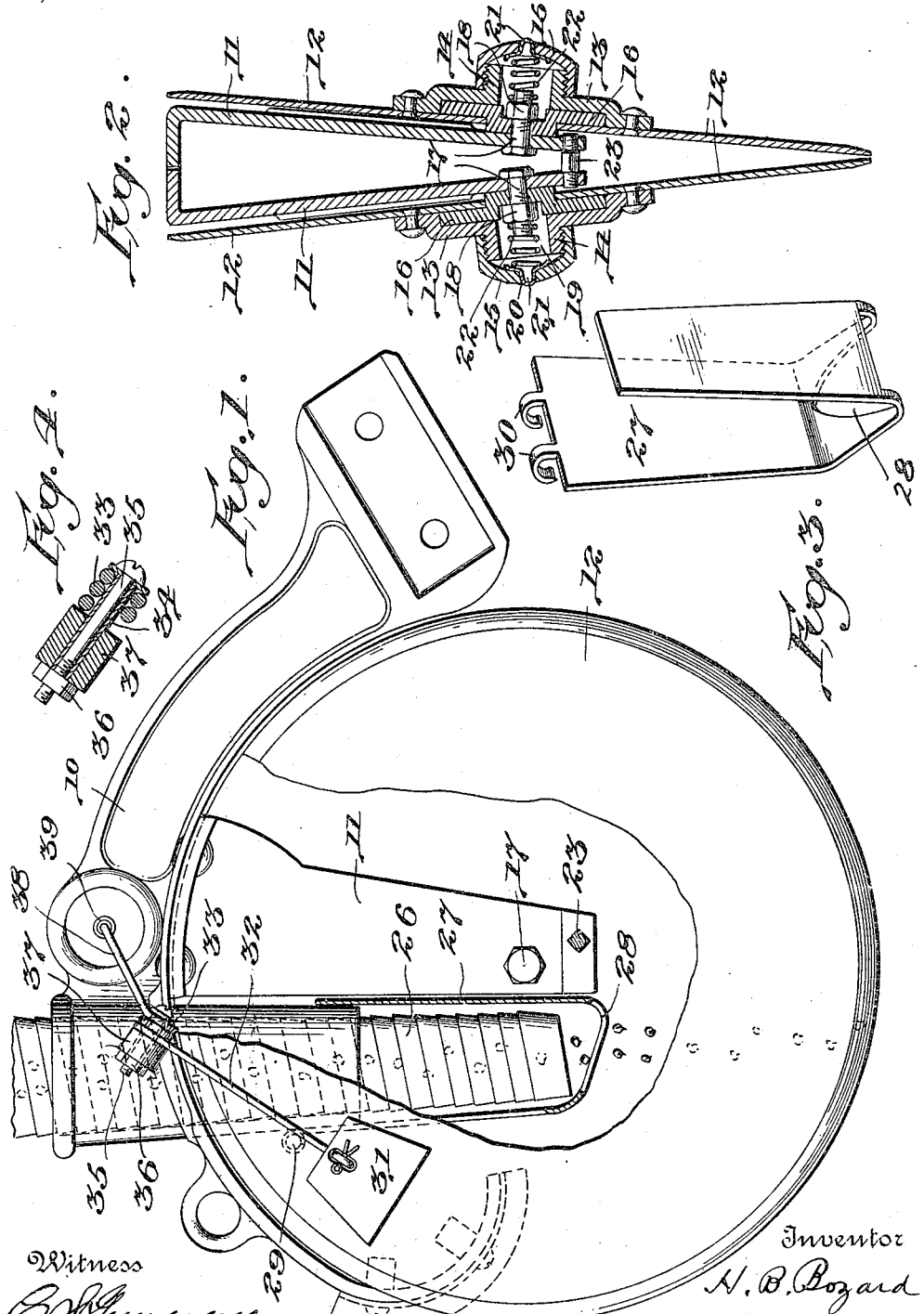

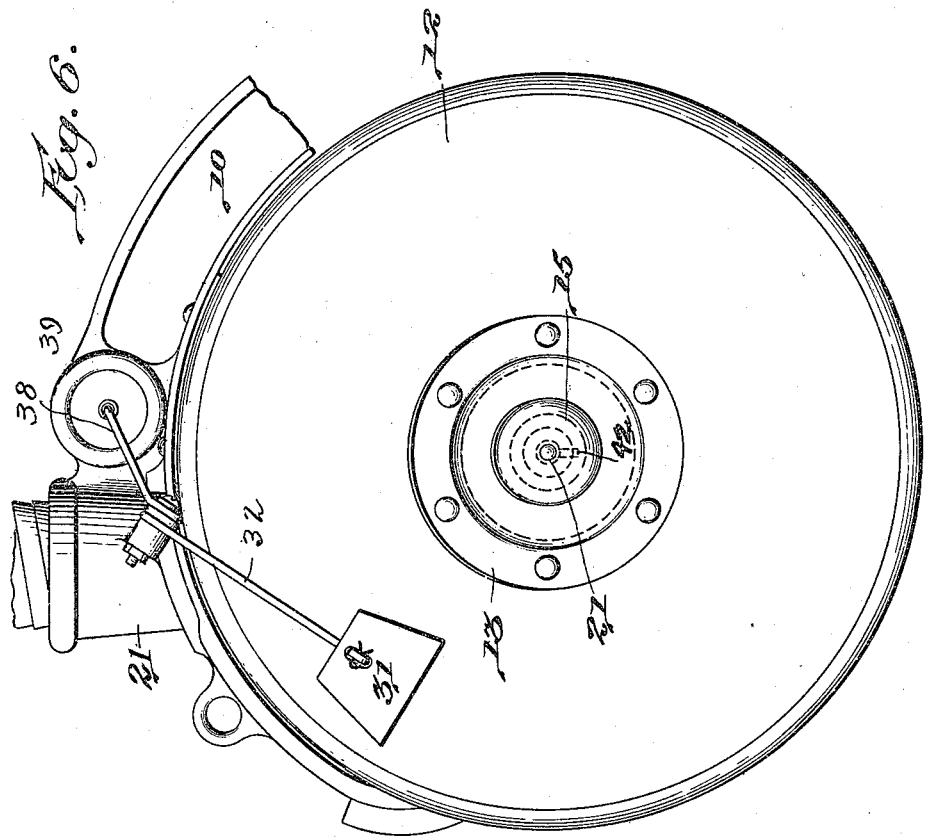
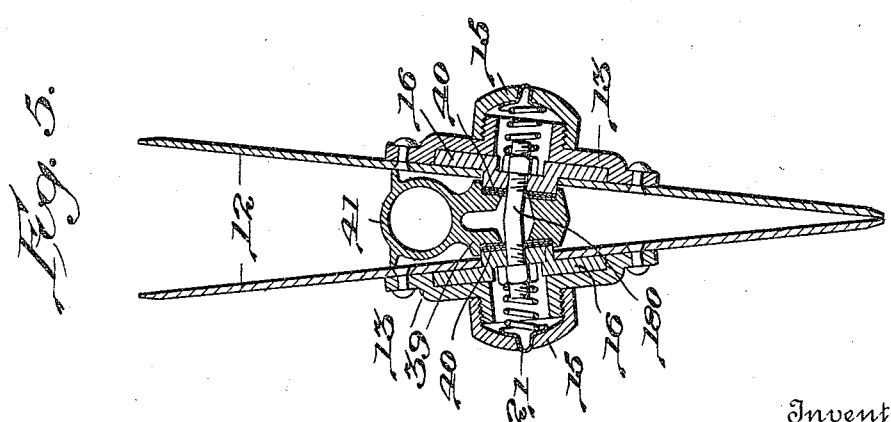

HARRISON B. BOZARD, OF LA CROSSE, WISCONSIN.

SEEDING-MACHINE.

1,204,239. Specification of Letters Patent. Patented Nov. 7, 1916.

Application filed May 27, 1915. Serial No. 30,810.

*To all whom it may concern:*

Be it known that I, HARRISON B. BOZARD, a citizen of the United States, and resident of La Crosse, in the county of La Crosse, and in the State of Wisconsin, have invented a certain new and useful Improvement in Seeding-Machines, and do hereby declare that the following is a full, clear, and exact description thereof.

My invention relates to disk attachments for seeding machines, and the object of my invention is to provide improvements in construction which will make for high efficiency, simplification of parts and durability, and in particular my invention has to do with the disk and boot construction in double disk attachments.

In the accompanying drawings Figure 1 is a side elevation of a double disk attachment embodying my invention with parts broken away for the purpose of better illustration; Fig. 2 is a section on the line 2—2 of Fig. 1; Fig. 3 a detail view in perspective of the tube supporting boot extension; Fig. 4 is a detail view in section showing the scraper arm pivoting means; Fig. 5 is a horizontal section illustrating a different embodiment of my invention; Fig. 6 is a side elevation of the same.

The frame 10, for the attachment of the drag bar, has riveted to it two right and left, but otherwise similar vertical stems 11, to which, at their lower ends are secured the bearings for the respective disks 12, the disks being, if desired, of the usual construction and "saw-hammered blades" with beveled outer edges. Riveted to the outside of each blade concentric therewith is a hub 13 with an outturned threaded neck 14 upon which is secured a removable hub cap 15. The hub 13 is offset so as to provide between it and the outer side of the disk an annular chamber that receives the circular bearing plate 16 for the disk which is securely clamped to the boot stem 11 by means of a headed bolt 17, and a nut 18, the bolt head being on the inner side of the stem and the nut 18 being on the outer side of the bearing plate and engaging an inwardly offset central portion thereof that is situated in the central hole in the disk. A sufficient space is left between the nut 18 and the hub neck 14 to provide an oil chamber 19. In the center of the cap 15 is an oil hole 20 which is kept yieldingly closed by a spring pressed cover 21 in the form of a disk of larger diameter than the oil hole 20 and situated inside the hub cap 15 with a central outwardly-extending teat, or projection that protrudes through the oil hole 20, said cover being engaged by one end of a coil spring 22 whose other end has a bearing against the outer side of the nut 18 and concentric with and encircling a projecting portion of the bolt 17. The cover 22 has an outturned rim, or edge which forms a seat for the end of the spring bearing thereagainst and thereby and with the seating of the other end of the spring around the projecting portion of the bolt 17 the spring is held from sidewise displacement. For oiling it is necessary simply to thrust the nozzle of the oil can against the portion of the cover 22 that projects into the oil hole 20 so as to force said cover inward and thereby open the oil hole 20. The oil finds its way from the chamber 19 between the bearing surfaces. The parts of my bearing are of such construction that they can be made of standard grade of cold rolled hardened steel which not only resists wear, but enables such close fitting of the wearing surfaces, even so close as from four to five thousandths of an inch, as to avoid that degree of looseness which has characterized bearings ordinarily made with which I am familiar, that results in such wabbling as quickly wears out the parts.

The peripheral edges of the disk in consequence of the grinding action of the soil rapidly wear away with the result that the disks do not remain in contact at their edges where they should and lateral support by such contact of the disks being thus eliminated, it follows that from the pressure on the outer side of the disks when they are forced into the ground they are sprung inward resulting in eccentric strains on the bearings and consequent rapid wearing out of the bearings. To remedy this trouble and to enable the peripheral contact of the disks to be maintained at all times despite their reduction of diameter by unavoidable wear, I provide an adjustable connection between the boot stems 11 that enables them and in consequence the disks which they respectively support to be adjusted toward each other. Said connection consists of a bolt 23 preferably located at the lower ends of the stems having its end portions provided with right and left thread, respectively, which enter correspondingly threaded holes in the stems so that by revolving said bolt by means of a suitable tool the desired movement of the stems and their respective disks necessary for proper relative position of the disk edges may be accomplished.

In rear of the stems 11 there is a boot shank 25 of the usual tubular construction for the passage of the conductor tube 26 which, preferably is made of steel ribbon spirally wound so that the tube may have a telescopic action contract or elongate longitudinally. Depending from the boot shank 25 and reaching to a point a short distance below the pivots of the disks, is an extension frame 27 that is substantially U-shape in side elevation, having no side walls, but a vertical front wall, an upwardly and rearwardly inclined rear wall, and an upwardly and rearwardly inclined bottom upon which the bottom of the tube 26 rests, said bottom being provided with an opening 28 through which seed guided by the conductor tube passes into the furrow opened by the disk. Said tube-supporting frame 27 is secured to the boot frame by a cotter pin 29 which passes through a suspending hook, or hooks 30 on the top of the rear wall of the frame 27. When the disks are lifted, since the conductor tube rests at its lower end upon the bottom of the extension frame 27, it will be contracted longitudinally by a telescopic action and when the disks are lowered for work again the conductor tube will elongate. Said extension frame obviously is simple and inexpensive to make, especially when compared with the well-known construction whose place it takes, which is cast with or forms part of the boot shank, as the inside requires to be cored out, and a form of support for the lower end of the conductor tube is employed which collects mud and dirt. By reason of the inclination of the rear wall of the extension frame, the seed discharging lower portion of the conductor tube 26 curves or inclines forward at an angle so that the seed delivered therefrom is directed to the center of the bottom of the cut made in the soil by the disks and at a point not in advance of a plane passing vertically through the center of the blades and without danger of displacement of the seed by the contact therewith of the revolving disks.

The scraper blade 31 for the outside of the disk is of usual shape, and it is carried by an arm 32 which is made of spring wire that is formed in a coil 33 by which the arm is pivotally attached to the boot frame, as by means of a sleeve, or bushing 34 through which a bolt 35 passes and which by means of a nut 36 secures it to a boss 37 on the side of the boot shank. The coil 33 is merely a pivot forming device and besides the arm that radiates from it to the end of which the blade 31 is attached, an arm 38 extends in the opposite direction to the ring guard of the boot and at its end is engaged by a coil spring 39 that acts to swing the scraper arm and yieldingly hold the scraper blade 31 in contact with the side of the disk.

An advantage in the opensided extension frame 27 lies in the fact that it enables the use of a seed tube of enlarged diameter due to the absence of side walls, which if present, would reduce the space between the disks available for the conductor tube by the thickness of such side walls. With no side walls the conductor tube can be of a diameter that extends entirely across from the inner side of one disk to the inner side of the other disk, there being no objection to contact of the conductor tube with the disk sides. Conductor tubes of larger diameter are desirable for the sowing of bearded oats.

Figs. 5 and 6 illustrate a construction in which the means for providing for the adjustment of the disks toward each other to compensate for the wear of their cutting edges is provided for by the use of a number of separately removable washers 40 that are interposed between the inner face of the inwardly offset central portion of the bearing plate 16, and the outer side of the supporting projection 39 on the boot 41, and which are concentric with the clamping bolt 180, which extends continuously through the two disks as a single member instead of being in the form of two separate bolts, as in the construction illustrated in Fig. 2. It will be seen that by removing one or more of the washers 40, according to the degree of wear of the cutting edges of the disks 12, the latter may be adjusted to compensate for such wear. The boot 41 in this case may be entirely a gray iron casting. The provisions for oiling the disk bearings shown in Fig. 5 are the same as what is illustrated in Fig. 2, and, therefore, need not be particularly described. In this construction I preferably provide as a suitable means for conducting the oil from the oil chamber a passage in the form of a radially extending groove, or slot 42 in the offset portion of the bearing plate 16.

Having thus described my invention what I claim is—

1. The combination of a boot frame, a pair of disks, stems reaching from the frame between the disks, a bearing connection between each disk and a stem, and an adjustable connection between the stems to adjust the disk edges with reference to each other and consisting of a bolt threaded at each end.

2. The combination of a boot frame, a pair of disks, stems reaching from the frame between the disks, a bearing connection between each disk and a stem, and an adjustable connection between the stems to adjust the disk edges with reference to each other, said adjustable connection consisting of a bolt with right and left thread that enter correspondingly threaded holes in their respective stems.

3. The combination of a pair of disks, a boot frame, a conductor tube, and a support for the lower end of the conductor tube consisting of a frame having vertically extending front and rear walls, and a bottom on which the lower end of the conductor tube is supported, said bottom having a hole for the passage of seed from the conductor tube.

4. The combination of a pair of disks, a boot frame, a conductor tube, and a support for the lower end of the conductor tube consisting of a frame having front and rear walls, and a bottom on which the lower end of the conductor tube is supported, said bottom having a hole for the passage of seed from the conductor tube, the rear wall of the frame being inclined upwardly and rearwardly and the bottom being inclined upwardly and rearwardly.

5. The combination of a pair of disks, a boot frame, a conductor tube, and a support for the lower end of the conductor tube consisting of a frame having front and rear walls, and a bottom on which the lower end of the conductor tube is supported, said bottom having a hole for the passage of seed from the conductor tube, the rear wall of the frame being inclined upwardly and rearwardly and the bottom being inclined upwardly and rearwardly, said rear wall having a hook connection with the boot frame.

6. The combination of a pair of disks, bearings therefor, a telescopic seed conductor tube extending between the disks, a boot extending between the disks, through which said conductor tube passes and below the lower end of which said conductor tube extends, and a support for the bottom portion of the conductor tube that engages the same below the boot.

7. The combination of a pair of disks, a flexible telescopic seed conductor tube extending downward between the disks and reaching from disk to disk, a U-shaped frame having its legs extending up and down, and the connection between said legs forming a support for the tube on which the lower end thereof rests, and a supporting pin with which one of said legs is connected and forming a support for said frame.

8. The combination of a pair of disks, a conductor tube extending downward between the disks and reaching from disk to disk, and a support for the tube consisting of a frame having front and back, but no side walls.

In testimony that I claim the foregoing I have hereunto set my hand.

HARRISON B. BOZARD.

Copies of this patent may be obtained for five cents each, by addressing the "Commissioner of Patents, Washington, D. C."